United States Patent [19]

Barber

[11] 4,184,834
[45] Jan. 22, 1980

[54] INJECTION MOLDING APPARATUS FOR PIPE FITTINGS

[75] Inventor: Jasper D. Barber, Charlotte, N.C.

[73] Assignee: Charlotte Pipe and Foundry Company, Charlotte, N.C.

[21] Appl. No.: 932,427

[22] Filed: Aug. 10, 1978

[51] Int. Cl.² .............................................. B29F 1/00
[52] U.S. Cl. .................................. 425/548; 249/144; 425/577
[58] Field of Search ...................... 425/547, 548, 577; 249/144, 145

[56] References Cited

U.S. PATENT DOCUMENTS

| | | | |
|---|---|---|---|
| 2,828,509 | 4/1958 | Smucker | 425/577 X |
| 3,752,436 | 8/1973 | Deutsch | 249/145 |

*Primary Examiner*—Thomas P. Pavelko
*Attorney, Agent, or Firm*—Bell, Seltzer, Park & Gibson

[57] ABSTRACT

An injection molding apparatus, including a mold having a mold cavity therein defining the outer periphery of a pipe fitting, has a core pin assembly adapted to be positioned in the cavity and which comprises opposing distal core sections whose proximal ends abut an intermediate core section therebetween. The core sections are mutually separable and have passages for accommodating a fluid coolant therein, and when the core sections are assembled, at least certain passages in either or both distal core sections are in fluid intercommunicating relation with passages in the intermediate core section. Means is provided for circulating fluid coolant through passages in all the core sections and comprises pump means for pumping fluid coolant at a predetermined pressure through the intercommunicating passages and for concurrently withdrawing the coolant therefrom at a suction pressure greater than the predetermined pressure to prevent leakage of the coolant from the intercommunicating passages outwardly between the abutting proximal ends of the corresponding core sections and into the mold cavity.

14 Claims, 8 Drawing Figures

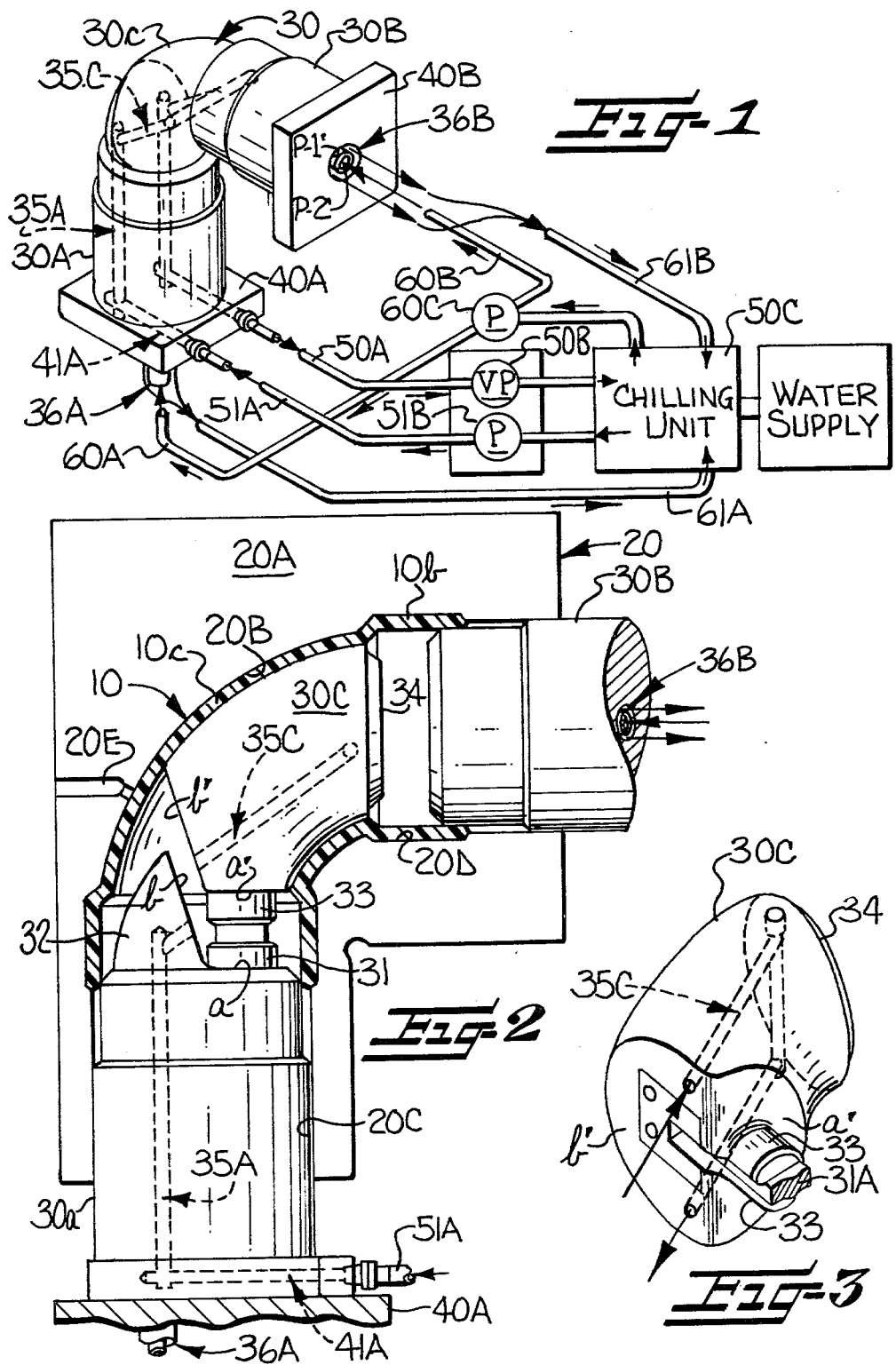

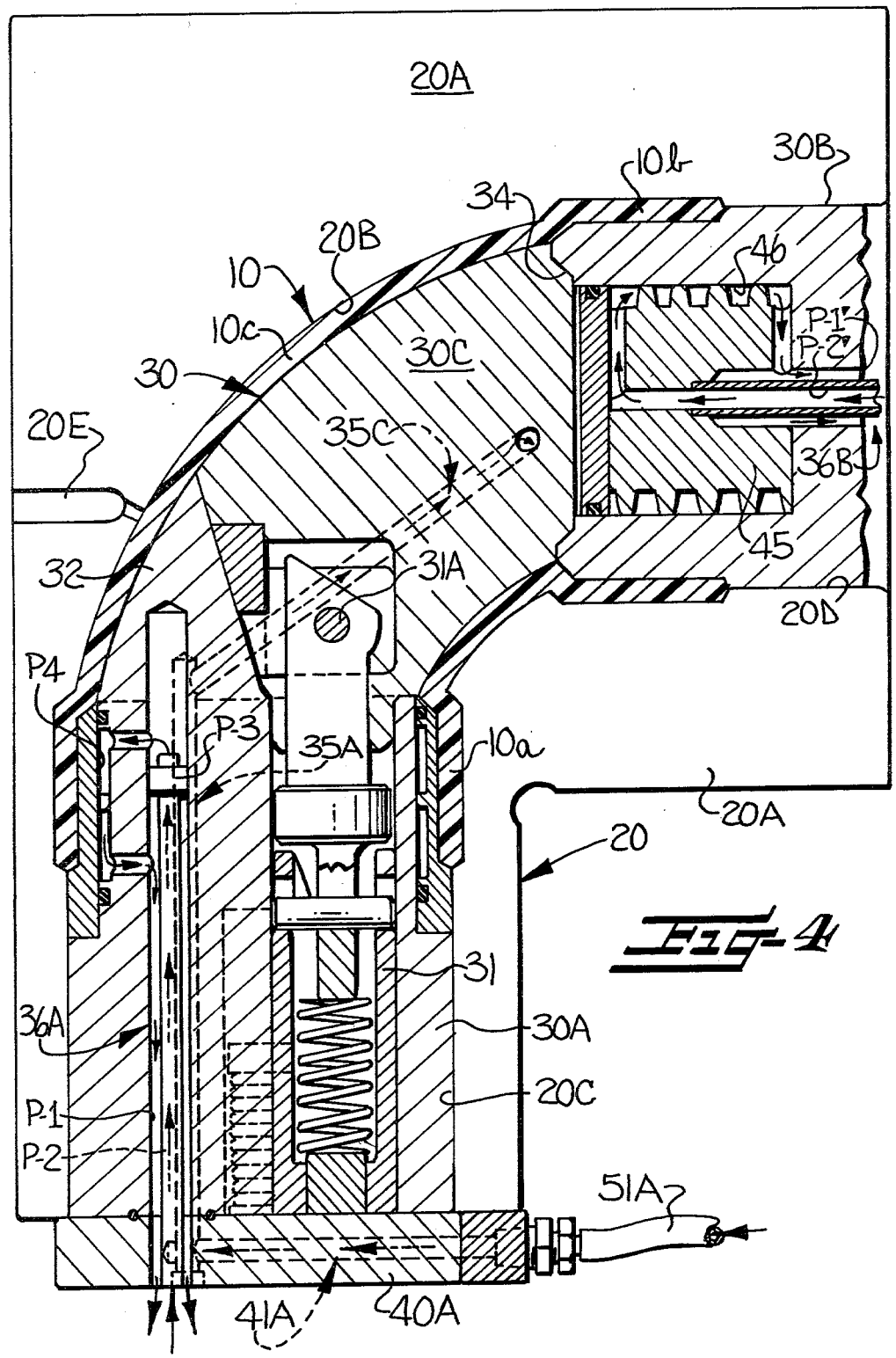

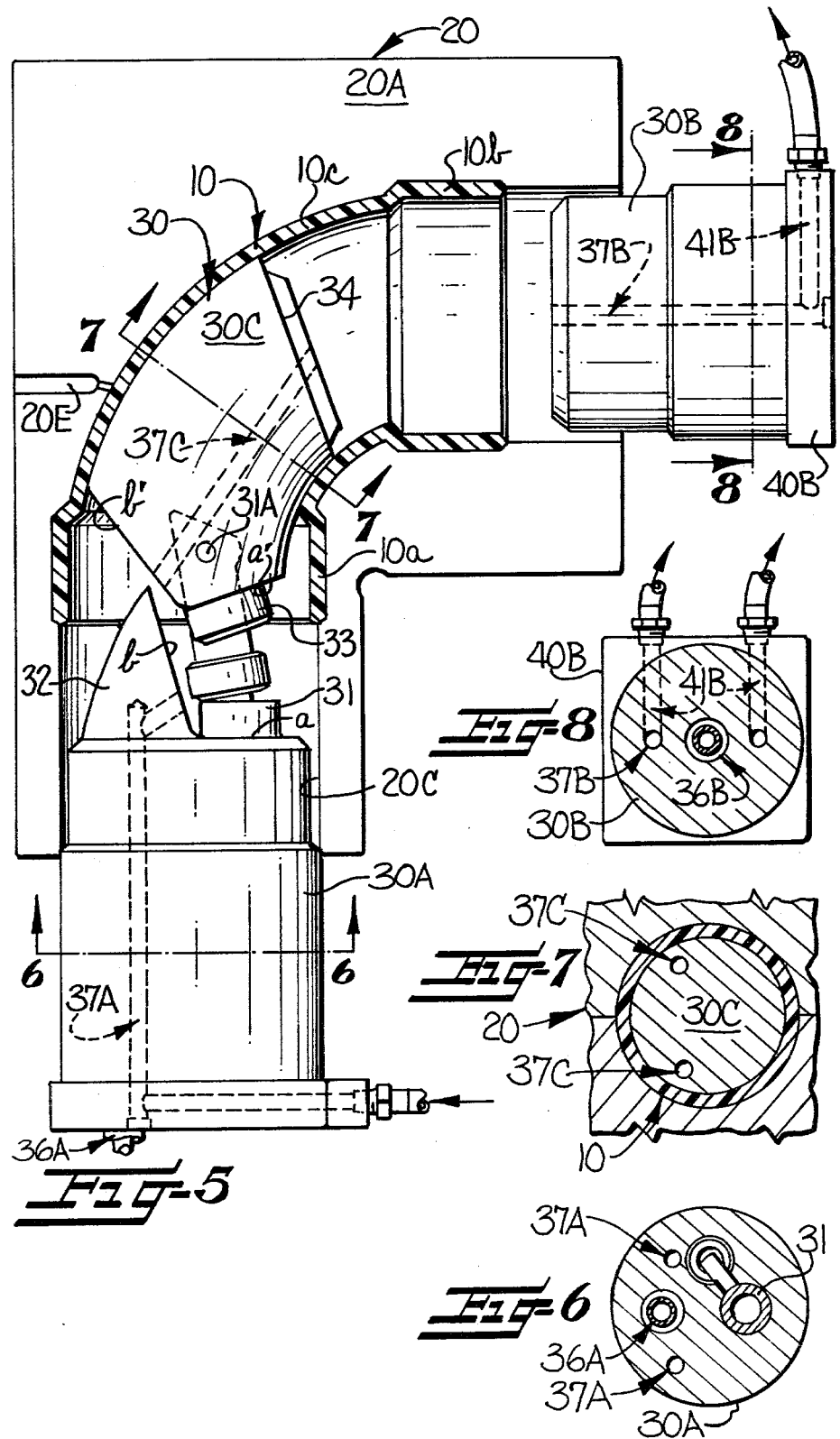

INJECTION MOLDING APPARATUS FOR PIPE FITTINGS

This invention relates to injection molding apparatus, and more particularly, to an improved injection molding apparatus for making plastic pipe fittings, such as pipe elbows.

It is a well-known practice in the art of injection molding of pipe fittings to utilize a mold having one or more mold cavities therein each defining the outer periphery of a desired pipe fitting, and to position in each such cavity a multi-sectional core pin assembly of such size and shape as to define the interior of the desired pipe fittings, and wherein a hot plastic material is injected into the mold cavity and around the core pin assembly for molding the pipe fitting. It also has been a well-known practice to circulate a fluid coolant through passages in the opposite or distal end core sections of such a core pin assembly for reducing the time required for sufficient dissipation of the heat of a molded pipe fitting to permit removal of the core pin assembly from the pipe fitting and removal of the pipe fitting from the mold cavity. In the injection molding of pipe elbows or other plastic pipe fittings of arcuate configuration however, it is necessary to utilize a curved or arcuate intermediate core section between opposite end or distal core sections, with the core sections being mutually separable to facilitate withdrawing the same from the molded pipe fittings.

It has been recognized as desirable to provide some way of cooling the intermediate core section by circulating a fluid coolant therethrough to reduce the cycle time for a molding operation and to thereby permit an increased rate of production. However, effective seals must be provided to prevent leakage of a fluid coolant from between the ends thereof into the mold cavity. As is well known, leakage of a fluid coolant would undesirably produce bubbles or holes in the plastic product being injection molded, thus resulting in an inferior or useless product being formed. To date, as far as is known, the manner in which distal end core sections fittingly cooperate with an intermediate core section presents peculiar problems, such as a shearing type of action when the core sections are moved into completely assembled relationship. This shearing type of action would result in a shearing effect on any resilient seal being provided between such core sections which would make the resilient seal of such short life as not to be commercially acceptable. Thus, heretofore no fluid cooling has been provided for the intermediate core section.

With the foregoing in mind, it is an important object of this invention to provide an improved injection molding apparatus for molding plastic pipe fittings; especially pipe elbows and the like, which overcomes the problems set forth above and thereby permits the molding of such pipe fittings at an increased rate of production.

According to the invention, the above object is achieved, in a molding apparatus of the type described, by providing an intermediate core section having passages therein which, during an injection molding operation, are in fluid intercommunicating relation with passages in at least one of the abutting distal core sections, and wherein means are provided for circulating fluid coolant through passages in all the core sections of the core pin assembly, and further, wherein the circulating means includes pump means for pumping a fluid coolant at a predetermined pressure through the intercommunicating passages of the one distal core section and the intermediate core section and for concurrently withdrawing the coolant therefrom at a suction pressure greater than the aforementioned predetermined pressure to prevent leakage of the coolant from the intercommunicating passages outwardly between the abutting proximal ends of the corresponding core sections and to thereby avoid the need for resilient sealing means between such abutting core sections.

It is another, more specific object of this invention to provide injection molding apparatus of the type last described wherein the pump means is also arranged for pumping the coolant at predetermined pressure through those passages in the other distal core section and for concurrently withdrawing the coolant therefrom at a suction pressure greater than the last-named predetermined pressure.

Still another object of the invention is to provide injection molding apparatus of the character described wherein additional pump means is provided for pumping fluid coolant through passages in either or both of the distal core sections independently of the aforementioned intercommunicating passages and the first-named pump means.

Some of the objects and advantages of the invention having been stated, others will appear as the description proceeds when taken in connection with the accompanying drawings, in which FIG. 1 is a schematic perspective view of a preferred form of core pin assembly and associated liquid coolant circulating system in accordance with this invention;

FIG. 2 is an enlarged elevational view of the core pin assembly of FIG. 1 showing distal core sections thereof partially withdrawn from a previously molded pipe fitting, the pipe fitting being shown in cross-section positioned within the mold cavity of one half of a mold;

FIG. 3 is a fragmentary perspective view showing the intermediate core section of the core pin assembly of FIG. 2 essentially disassociated from the corresponding pair of distal core sections;

FIG. 4 is an enlarged view of the mold and core pin assembly of FIG. 2, but showing the core pin assembly in cross-section and more in detail with all the core sections of the core pin assembly being in completely assembled, abutting end-to-end relationship in the mold cavity;

FIG. 5 is a view similar to FIG. 2, but illustrating a modified or second embodiment of the invention in which fluid coolant passages in both distal or end core sections of the core pin assembly are arranged for intercommunication with passages in the intermediate core section, but wherein the distal core sections are shown further withdrawn from the molded pipe fitting than is the case in FIG. 2, and also wherein the intermediate core section is partially withdrawn from the corresponding pipe fitting; and FIGS. 6, 7 and 8 are fragmentary transverse sectional views through various sections of the core pin assembly of FIG. 5 taken substantially along lines 6—6, 7—7 and 8—8, respectively.

Before describing the invention in detail, it is to be noted that the two embodiments of the molding apparatus in the drawings are shown as being especially devised for the injection molding of a pipe elbow 10 of the type having opposing or distal end enlarged tubular hub or bell portions 10a, 10b interconnected by an arcuate tubular intermediate body portion 10c. However, it is to be understood that either or both ends of the pipe fitting may be in the form of respective "spigots" wherein they are coextensive portions of and are of about the same exterior and interior diameters as the intermediate body portion, or the pipe fitting may take other forms as are well known in the art of manufacture of pipe fittings.

The molding apparatus of the present invention is adapted for installation in a conventional or other injection molding machine of well-known type having means for closing and opening the two cooperating halves or symmetrical body portions of a mold and concurrently moving the distal components or sections of a core pin assembly inwardly and outwardly, into and out of completely or fully assembled relationship, respectively, to accommodate injection of hot plastic material into the mold cavity and subsequent removal of the plastic fitting from the mold. Since such injection molding machines are well-known in the art, a detailed illustration and description thereof is deemed unnecessary and only and function of the conventional molding machine will be given as it relates to the operation of various components of the present injection molding apparatus. It is also to be noted that, although only a single mold cavity is shown in the mold of the present apparatus, it is to be understood that several mold cavities may be present therein without departing from the invention.

Referring now more specifically to the drawings, in both the first embodiment of FIGS. 1–4 and the second or modified embodiment of FIGS. 5–8, the apparatus is shown as comprising a mold 20 and a core pin assembly 30 which may be of essentially the same construction in both embodiments, with the exception of the arrangement of fluid passages in the core pin assembly 30 of FIGS. 1–4 differing somewhat from the arrangement of fluid passages in FIGS. 5–8. Accordingly, in order to avoid repetitive description, the same reference characters shall apply to like elements of both embodiments of the invention and the differences in the two embodiments will be pointed out as the description proceeds.

As heretofore indicated, the mold 20 may be of conventional construction including opposing relatively movable body portions or halves 20A, only one of which is shown in FIGS. 2, 4 and 5, since they are essentially symmetrical with their proximal mold faces being mirror images of one another. The mold 20 is provided with a mold cavity 20B therein defining the outer periphery of the desired pipe fitting 10 and having openings 20C, 20D at its opposite ends for receiving therein the enlarged body portions of respective opposite end or distal core sections 30A, 30B of the core pin assembly 30.

The proximal ends of the distal core sections 30A, 30B are adapted to abut opposite ends of at least one intermediate core section 30C therebetween such that, when the core sections 30A, 30B, 30C are fully assembled as in FIG. 4, they are collectively of such size and shape as to define the interior of the desired pipe fitting 10. However, the core sections 30A, 30B, 30C are mutually separable to facilitate removal of the core pin assembly 30 from the mold 20 (through the successive stages of FIGS. 4, 2 and 5) and the pipe fitting 10 therein following the injection of a hot plastic material, via the passageway or passageways 20E of mold 20 into the mold cavity 20B and around the core pin assembly 30.

The first and second distal core sections 30A, 30B are inserted in and withdrawn from opposite end openings 20C, 20D of the mold cavity 20B in respective substantially straight paths, but in the molding of a pipe elbow or other curved or arcuate pipe fitting, it can be appreciated that the intermediate core section 30C must move angularly relative to the distal core sections 30A, 30B and in an arcuate path during the insertion of the same in the mold cavity 20B and during the withdrawal thereof from the molded pipe fitting 10. Therefore, in order to insert and remove the intermediate core section 30C with respect to the mold cavity 20B, one of the distal core sections; i.e., the distal core section 30A in this instance, is provided with means for telescopically and articulately connecting the inner or proximal portion of the same to the intermediate core section 30C. To this end, it will be observed in FIG. 4 that a spring-loaded plunger 31 extends upwardly from within the body of the first distal core section 30A and into the body of the intermediate core section 30C where the plunger 31 is pivotally connected, as at 31A, to the intermediate core section 30C.

The molding apparatus is provided with conventional or other suitable operating means, not shown, for closing and opening the opposing mold body portions 20A relative to each other concurrently with respectively inserting and withdrawing the core pin assembly 30 relative to the mold cavity 30B. In this regard, in order to facilitate the positioning of the inner end of the first distal core section 30A in contacting abutting relation to the proximal, first, end of the intermediate core section 30C, so as to insure a minimum of clearance therebetween upon these two core sections being inserted into mold cavity 20B through the successive stages of FIGS. 5, 2 and 4, the proximal abutting ends of core sections 30A, 30C are of mating substantially V-shaped configuration forming radially inward substantially semicircular shelf surfaces a, a' on the respective core sections 30A, 30C which extend substantially perpendicular to the longitudinal axis of the first distal core section 30A.

The V-shaped inner end of the first distal core section 30A is also defined by a substantially semicircular inclined surface b formed on an outwardly projecting curved-surfaced portion 32 projecting longitudinally from the inner end of the first distal core section 30A. The inclined surface b on the first distal core section 30A is adapted to fit against a corresponding substantially semicircular end surface b' extending angularly outwardly from the surface a' but extending substantially perpendicular to the axis of the corresponding end of the intermediate core section 30C.

The other or second end of the intermediate core section 30C extends substantially perpendicular to the longitudinal axis of the intermediate core section 30C and is adapted to fit in mating abutting relation to the inner end of the second distal core section 30B. Thus, as the core pin assembly 30 is being inserted in the mold cavity 20B by the aforementioned conventional operating means, and preparatory to a molding operation, the spring-loaded plunger 31 initially maintains the first distal core section 30A and the intermediate core section 30C in axially spaced relation, substantially as shown in FIG. 5, so that the intermediate core section 30C may pivot on the inner end of plunger 31 in seeking its own position within the mold cavity 20B. When the intermediate core section 30C has moved inwardly to its full extent within the mold cavity 20B, substantially as shown in FIG. 2, plunger 31 is restrained, by conventional restraining means not shown, against further inward movement such that the first distal core section 30A then moves inwardly, from the position of FIG. 2 to that of FIG. 4, relative to the plunger 31 and the intermediate core section 30C. In so doing, a pilot projection 33, extending substantially axially outwardly from the shelf surface a' at the first end of the intermediate core section 30C, is then positioned in axial alignment with and is received in the bore in which the aforementioned plunger 31 is positioned, it being noted that the upper portion of plunger 31 slidably penetrates the aforementioned pilot projection 33.

As the pilot projection 33 is being received in the bore for plunger 31 in the first distal core section 30A, it is apparent that the inclined surface b' on the first distal core section 30A is moving along beside and toward the surface b' on the corresponding end of the intermediate core section 30C so that the two surfaces a, b on the inner end of the first distal core section 30A substantially simultaneously move into abutting engagement with the respective surfaces a', b' on the proximal end of the intermediate core section 30C. It is axiomatic that there may be a shearing type of action between surfaces b, b' when the core sections 30A, 30C are being moved into completely and fully assembled relationship.

The pilot projection 33, cooperating with the bore in which the plunger 31 is positioned, serves to maintain the intermediate core section 30C in predetermined spaced relationship from the wall of the mold cavity 20B. Such spaced relationship of the intermediate core section 30C is aided by engagement of a substantially circular disc-like projection 34 on the second end of the intermediate core section 30C being engaged by a correspondingly shaped, matingly tapered inner end portion of the second distal core section 30B as shown in FIG. 4.

It is apparent that the second distal core section 30B reaches its fully inserted position of FIG. 4 substantially simultaneously with the first distal core section 30A having reached its fully inserted position of FIG. 4. The withdrawal of the core sections 30A, 30B, 30C is substantially the reverse procedure to that heretofore described with respect to the insertion of such core sections into the mold cavity 20B. Therefore, a further more detailed description of the manner in which the core pin assembly 30 is inserted in and withdrawn from the mold cavity 20B is deemed unnecessary.

As is well known, from the standpoint of efficient high speed production, it is desirable to effect cooling of the core pin assembly of an injection molding apparatus as rapidly as is practicable following injection of the hot plastic material into the mold cavity and around the core pin assembly. As indicated earlier herein, it has been the customary practice to cool distal core sections in a multisectional core pin assembly by circulating a fluid coolant under positive pressure through passages in such distal core sections. However, difficulties have been experienced heretofore in the cooling of intermediate core sections of the type described herein because attempts to circulate fluid coolant between either distal core section and an intermediate core section positioned therebetween would cause the coolant to leak into the mold cavity and thereby produce bubbles or holes in the wall of a pipe fitting or other tubular product being injection molded, thus resulting in an inferior or useless plastic product being formed.

In accordance with this invention, the intermediate core section 30C, as well as distal core sections 30A, 30B abutting the intermediate core section, have respective fluid passages therein, and circulating means effects circulation of fluid coolant through passages in all such core sections, such circulating means including pump means for pumping fluid coolant through intercommunicating passages in the intermediate core section and either or both distal core sections in such a manner as to prevent leakage of the coolant from the intercommunicating passages outwardly between the abutting proximal ends of the corresponding core sections.

In the first embodiment of the invention shown in FIGS. 1-4, the circulating means circulates fluid coolant through intercommunicating primary passages in the first distal core section 30A and the intermediate core section 30C and through secondary passages present only in the distal core sections 30A, 30B. In the second embodiment, intercommunicating primary passages are present in the core sections 30A, 30B, 30C, and secondary passages similar to those of the first embodiment may be provided in the two distal core sections 30A, 30B of FIG. 5. The primary passages of the first embodiment of the invention and present in the first distal core section 30A and the intermediate core section 30C are broadly designated at 35A, 35C, respectively, in FIGS. 1-4. The secondary passages in the first and second distal core sections 30A, 30B of the first embodiment of the invention, and where shown in the second embodiment of the invention, are respectively broadly designated at 36A, 36B.

The primary, intercommunicating, passages of the second embodiment of the invention shown in FIGS. 5-8, and present in the respective core sections 30A, 30B, 30C are respectively broadly designated at 37A, 37B, 37C in order that they may be clearly distinguished from the intercommunicating passages 35A, 35C of the first embodiment of the invention as described with particular reference to FIG. 4.

The remote or outer ends of the distal core sections 30A, 30B are suitably secured to respective substantially rectangular plates 40A, 40B sometimes referred to in the art as "slides". As shown in FIGS. 1 and 4, the slides 40A, 40B have respective suitable openings therethrough which communicate with and form extensions of the respective secondary passages 36A, 36B. In the first embodiment of the invention, the slide 40A has lateral passages 41A opening to one side thereof and communicating with the passages 36A of FIGS. 1, 2 and 4. In the second embodiment of the invention, it is apparent that slide 40A also has lateral passages 41A therein, but these passages 41A communicate with the longitudinal passages 37A in the first distal core section 30A (FIGS. 5 and 6).

In the first embodiment of the invention, the passages 35A, 35C take the form of respective pairs of longitudinally extending fluid branches or runs in the respective core sections 30A, 30C, and wherein the runs of passages 35A extend from end-to-end of the first distal core section 30A with the proximal ends of the runs of the passages 35A, 35C in the two core sections 30A, 30C being in direct alignment with one another so as to provide desired intercommunication therebetween when the proximal ends of the core sections 30A, 30C are in abutting end-to-end relationship. It is to be noted that, in the first embodiment of the invention, the fluid passage runs of the passages 35C in the intermediate core section 30C terminate in intercommunicating relation to each other adjacent the proximal end of the second distal core section 30B. In this instance, since the runs of passages 35C are shown extending substantially parallel with each other, their ends remote from the first distal core section may be interconnected by a lateral fluid passage run extending therebetween (see FIGS. 1, 3 and 4).

The secondary fluid passages 36A (FIG. 4) are formed in the first distal core section 30A by a longitudinally extending bore P-1 within which a relatively small elongate tube P-2 is positioned, with a suitable seal P-3 encircling the inner or upper portion of the tube within the bore P-1 so that the fluid may flow out of the upper open end of tube P-2 and into an annular passageway P-4 formed in the wall of the upper medial portion of the first distal core section 30A. The fluid passageway P-4 communicates with the bore P-1 below the seal P-3 so the fluid may flow out of the first distal core section 30A via the bore P-1 of the corresponding secondary passages 36A.

In FIG. 4 it will be observed that the secondary passages 36B in the second distal core section 30B take the form of an axially extending bore P-1' and a tube P-2' similar to the respective bore P-1 and tube P-2 in the first distal core section 30A. The tube P-2' communicates with the central portion of a tubular but externally threaded member 45 fitting in a closed chamber 46 in the inner portion of the second distal core section 30B. By this arrangement, the fluid coolant may enter the second distal core section 30B through the tube P-2', then flow through the internal portion of the externally threaded member and then outwardly and in a spiral path around the threaded member and back to the bore P-1' to flow out of the second distal core section 30B.

By referring to FIG. 1, it will be observed that there is provided a means for circulating fluid coolant through the passages in all of the core sections during a molding operation. Such circulating means may be arranged in various ways as will be presently described, provided that the circulating means includes pump means for pumping a fluid coolant at a predetermined positive pressure through any passages of either or both of the distal core sections 30A, 30B which are in intercommunicating relation with any passage in the intermediate core section 30C and for concurrently withdrawing the coolant therefrom at a suction pressure greater than the predetermined pressure so as to prevent leakage of the coolant from such intercommunicating passages outwardly between the abutting proximal ends of the corresponding core sections. In the first embodiment of the invention, it will be noted (FIG. 1) that one of the runs or branches of the passages 41A in the slide 40A has a suction conduit 50A leading therefrom to the suction side of a vacuum pump 50B which directs fluid coolant or water into a suitable chilling unit 50C connected to a suitable coolant or water supply.

The other run of the primary passages 41A in the slide 40A has one end of a fluid pressure conduit 51A connected thereto and leading therefrom to the output side of a positive pressure pump 51B which, during a molding operation, directs fluid coolant from the chilling unit 50C under positive pressure into the corresponding run of the passages 41A in the slide 40A. Thus, since the primary passages 35A, 35C, 41A are all in fluid intercommunicating relationship while the proximal ends of the first distal core section 30A and the intermediate core section 30C are in abutting relationship in the mold cavity 20B, it can be appreciated that the vacuum pump 50B and the pressure pump 51B, along with conduits 50A, 51A constitute pump means, in the first embodiment of the invention, for pumping a fluid coolant at a predetermined pressure through the intercommunicating passages 35A, 35C, 41A, through one of the distal core sections (the distal core section 30A in this instance) and the intermediate core section 30C, and for concurrently withdrawing the coolant therefrom at a suction pressure greater than the aforementioned predetermined pressure to prevent leakage of the coolant from the intercommunicating passages outwardly between the abutting proximal ends of the corresponding core sections.

As indicated above, the fluid coolant circulating means may be arranged in various ways. For example, if so desired, the suction side of vacuum pump 50B and the output side of pressure pump 51B may be communicatively connected to the passages 36A and/or 36B for circulating fluid coolant therethrough, but since a conventional injection molding machine is usually equipped with a positive pressure pump means and the fluid passages 36A, 36B do not extend all the way to the inner ends of the distal core sections and, thus, do not communicate with passages in the intermediate core section 30C, the first embodiment of the invention is illustrated in FIG. 1 as having a separate pump means, operating independently of the pump means 50A, 50B, 51A, 51B, for pumping fluid coolant under positive pressure through the passages 36A, 36B (FIG. 4) in the distal core sections 30A, 30B in a fluid flow circuit independent of the fluid flow circuit for the intermediate core section 30C.

Accordingly, it will be observed in FIG. 1 that corresponding ends of fluid in-flow and out-flow conduits 60A, 61A and 60B, 61B are connected to the respective secondary fluid passages 36A, 36B, it being apparent by reference to FIG. 4 that conduits 60A, 61A are communicatively connected to the tube P-2 and the bore P-1, respectively, of passages 36A for communication therewith, and the conduits 60B, 61B are communicatively connected to corresponding ends of the tube P-2' and the bore P-1', respectively, of the passageways 36B. The ends of the conduits 60A, 60B remote from the respective secondary passages 36A, 36B are connected to the output side of a positive pressure 60C whose input side is connected to the chilling unit 50C for receiving the fluid coolant therefrom. The conduits 61A, 61B are arranged for returning the fluid coolant being pumped into the respective secondary passages 36A, 36B to the chilling unit or water supply.

As indicated herein, secondary passages may be arranged in the distal core sections 30A, 30B of the second embodiment of the invention, and fluid coolant may be circulated therethrough, in substantially the same manner as that described with respect to the first embodiment of the invention, it being noted that the second embodiment differs essentially from the first embodiment of the invention in that primary passages 37A, 37B in both of the respective distal core sections 30A, 30B thereof are arranged for direct intercommunication with corresponding ends of passages 37C extending all the way through the intermediate core section 30C when the corresponding core pin assembly of FIG. 5 is completely assembled in the mold 20 in operative relation to mold cavity 20B preparatory to the molding operation, whereas the passages 35C in the intermediate core section 30C of FIGS. 1-4 communicate with corresponding primary passages in only one of the distal core sections in the first embodiment of the invention.

Although the fluid flow circuits for the second embodiment of the invention in FIGS. 5-8 may differ somewhat from the fluid flow circuits in the first embodiment of the invention, a detailed description and illustration thereof is deemed unnecessary, it being deemed sufficient to state that the output side of the pump 51B of FIG. 1 may be connected to the corresponding ends of the two lateral runs of the primary passages 41A in FIG. 5, and the suction side of the vacuum pump 50B of FIG. 1 may be connected to the two runs of the primary passages 37B in the second distal core section 30B via corresponding lateral primary passages 41B in the slide 40B. Thus, with respect to the second embodiment of the invention shown in FIGS. 5–8, it can be appreciated that means are provided for circulating fluid coolant through passages in all of the core sections of the core pin assembly 30, and that such circulating means includes pump means for pumping a fluid coolant at a predetermined pressure through the intercommunicating passages 37A, 37B, 37C, 41A, 41B so that the fluid coolant is pumped through all the core sections 30A, 30B, 30C and is concurrently withdrawn therefrom at a suction pressure greater than the predetermined pressure so as to prevent leakage of the coolant from the intercommunicating passages outwardly between the abutting proximal ends of the intermediate and distal core sections.

It is preferred that the pump means embodied in the vacuum pump 50B and the positive pressure pump 51B of FIG. 1 is of a type in which the flow of fluid coolant through the pump 51B may be shut off following the desired period during which coolant is being circulated through the corresponding primary passages of the core pin assembly 30, whereupon the vacuum pump 50B will evacuate the corresponding fluid passages of liquid coolant therein, thus insuring that the molded pipe fitting 10 therein will not be contacted by the liquid coolant during the withdrawal of the corresponding core pin assembly 30 from the molded pipe fitting.

From the foregoing description, it can be seen that there is provided an injection molding apparatus for molding pipe fittings from hot plastic material which includes a mold having a mold cavity therein defining the outer periphery of a desired pipe fitting, and wherein a core pin assembly comprising a pair of distal core sections and an intermediate core section therebetween is provided with passages for accommodating a fluid coolant therein during a molding operation in which the core sections are positioned in abutting end-to-end relationship in the mold cavity. It can be appreciated that the present invention also provides means for circulating fluid coolant through passages in all the core sections during a molding operation, which circulating means includes pump means for pumping a fluid coolant at a predetermined pressure through intercommunicating passages of at least one of the distal core sections and the intermediate core section and for concurrently withdrawing the coolant therefrom at a suction pressure greater than the predetermined pressure to prevent leakage of the coolant from the intercommunicating passages outwardly between the abutting proximal ends of the corresponding core sections.

In the drawings and specification there have been set forth preferred embodiments of the invention, and although specific terms are employed, they are used in a generic and descriptive sense only and not for purposes of limitation.

That which is claimed is:

1. In an injection molding apparatus for molding pipe fittings from hot plastic material and including a mold having a mold cavity therein defining the outer periphery of a desired pipe fitting; the combination therewith of a core pin assembly comprising a pair of distal core sections with at least one intermediate core section therebetween and collectively being of such size and shape as to define the interior of a desired pipe fitting, said core sections being mutually separable and having respective passages for accommodating a fluid coolant therein, said core sections being adapted to be positioned in abutting end-to-end relationship in said mold cavity with at least certain of the passages in at least one of said distal core sections in fluid intercommunicating relation with passages in said intermediate core section, means for circulating fluid coolant through passages in all of said core sections during a molding operation, and said circulating means including pump means for pumping a fluid coolant at a predetermined pressure through the intercommunicating passages of said one distal core section and said intermediate core section and for concurrently withdrawing the coolant therefrom at a suction pressure greater than said predetermined pressure to prevent leakage of the coolant from said intercommunicating passages outwardly between the abutting proximal ends of the corresponding core sections.

2. Apparatus according to claim 1 wherein said pump means is arranged for also pumping fluid coolant at a predetermined pressure through those passages in said other of the distal core sections and for concurrently withdrawing the coolant therefrom at a suction pressure greater than said last-named predetermined pressure.

3. Apparatus according to claim 1 wherein said circulating means further includes additional pump means for pumping fluid coolant through said passages in the other of said distal core sections independently of said first-named pump means.

4. Apparatus according to claim 1 wherein said one distal core section is provided with additional passages therein out of communication with said intercommunicating passages, and wherein said circulating means also includes additional pump means for pumping fluid coolant through said additional passages independently of said first-named pump means.

5. Apparatus according to claim 4 including means connecting said additional pump means to said passages in the other of said distal core sections for pumping fluid coolant therethrough independently of said first-named pump means.

6. Apparatus according to claim 1 wherein said intercommunicating passages in said one distal core section and said intermediate core section define respective pairs of fluid passage runs extending generally longitudinally in each of the corresponding core sections, and wherein the fluid passage runs in said intermediate core section terminate in intercommunicating relation to each other adjacent the proximal end of the other distal core section.

7. Apparatus according to claim 1 wherein said mold cavity is shaped to define the outer periphery of a pipe elbow and said intermediate core section is of arcuate form, and means telescopically and articulately interconnecting proximal portions of said intermediate core section and said one distal core section to facilitate withdrawing said intermediate core section from a pipe elbow fitting molded therearound.

8. In an injection molding apparatus for molding pipe fittings from hot plastic material and including a mold having a mold cavity therein defining the outer periphery of a desired pipe fitting; the combination therewith of a core pin assembly comprising a pair of distal core sections with at least one intermediate core section therebetween and collectively being of such size and shape as to define the interior periphery of a desired pipe fitting, said core sections being mutually separable and having respective passages for accommodating a fluid coolant therein, said core sections being adapted to be positioned in abutting end-to-end relation in said mold cavity with at least certain of the passages of one of said distal core sections being in fluid intercommunicating relation with passages in said intermediate core section, but wherein said intercommunicating passages are out of communication with those passages in the other of said distal core sections, means for circulating fluid coolant through passages in all said core sections during a molding operation, and said circulating means including pump means for pumping a fluid coolant at a predetermined pressure through the intercommunicating passages of said one distal core section and said intermediate core section and for concurrently withdrawing the coolant therefrom at a suction pressure greater than said predetermined pressure to prevent leakage of the coolant from said intercommunicating passages outwardly between the abutting proximal ends of the coresponding core sections.

9. Apparatus according to claim 8 wherein said pump means is arranged for also pumping fluid coolant at a predetermined pressure through those passages in said other of the distal core sections and for concurrently withdrawing the coolant therefrom at a suction pressure greater than said last-named predetermined pressure.

10. Apparatus according to claim 8 wherein said circulating means further includes additional pump means for pumping fluid coolant through those passages in said other distal core section independently of said first-named pump means.

11. Apparatus according to claim 8 wherein said one distal core section is provided with additional passages therein out of communication with said intercommunicating passages, and wherein said circulating means also includes additional pump means for pumping fluid coolant through said additional passages independently of said first-named pump means.

12. Apparatus according to claim 11 including means connecting said additional pump means to those passages in said other distal core section for pumping fluid coolant therethrough independently of said first-named pump means.

13. In an injection molding apparatus for molding pipe fittings from hot plastic material and including a mold having a mold cavity therein defining the outer periphery of a desired pipe fitting; the combination therewith of a core pin assembly comprising a pair of distal core sections with at least one intermediate core section therebetween and collectively being of such size and shape as to define the interior of a desired pipe fitting, said core sections being mutually separable and having respective passages for accommodating a fluid coolant therein, said core sections being adapted to be positioned in abutting end-to-end relationship in said mold cavity with at least certain of the passages in both of said distal core sections in fluid intercommunicating relation with passages in said intermediate core section, means for circulating fluid coolant through passages in all of said core sections during a molding operation, and said circulating means including pump means for pumping a fluid coolant at a predetermined pressure through the intercommunicating passages of said distal core sections and said intermediate core section and for concurrently withdrawing the coolant therefrom at a suction pressure greater than said predetermined pressure to prevent leakage of the coolant from said intercommunicating passages outwardly between the abutting proximal ends of the corresponding core sections.

14. Apparatus according to claim 13 wherein said distal core sections are provided with respective additional fluid passages therein which are out of fluid communication with said intercommunicating passages, and wherein said circulating means further includes additional pump means for pumping fluid coolant through said additional passages independently of said first-named pump means.

* * * * *